US010262124B2

(12) United States Patent
Kurian et al.

(10) Patent No.: US 10,262,124 B2
(45) Date of Patent: Apr. 16, 2019

(54) AUTONOMOUS SOFTWARE CONTAINERS

(71) Applicant: Bank of America Corporation, Charlotte, NC (US)

(72) Inventors: Manu Kurian, Dallas, TX (US); Mark E. Wenzel, Charlotte, NC (US); Richard A. Mobley, Charlotte, NC (US); Gregory Sito, Charlotte, NC (US); Paul Grayson Roscoe, Chester (GB)

(73) Assignee: Bank of America Corporation, Charlotte, NC (US)

( * ) Notice: Subject to any disclaimer, the term of this patent is extended or adjusted under 35 U.S.C. 154(b) by 198 days.

(21) Appl. No.: 15/408,957

(22) Filed: Jan. 18, 2017

(65) Prior Publication Data
US 2018/0205708 A1    Jul. 19, 2018

(51) Int. Cl.
*G06F 21/32* (2013.01)
*G06F 21/12* (2013.01)
*G06F 9/455* (2018.01)

(52) U.S. Cl.
CPC .......... *G06F 21/32* (2013.01); *G06F 9/45558* (2013.01); *G06F 21/121* (2013.01); *G06F 2009/45587* (2013.01); *G06F 2221/0704* (2013.01); *G06F 2221/2101* (2013.01); *G06F 2221/2111* (2013.01)

(58) Field of Classification Search
CPC . H04L 63/0428; H04L 63/1466; G06F 21/32; G06F 21/602; G06F 21/6218
See application file for complete search history.

(56) References Cited

U.S. PATENT DOCUMENTS 6,052,527 A    4/2000 Delcourt et al.
6,272,674 B1    8/2001 Holiday, Jr.
(Continued)

OTHER PUBLICATIONS

"What is Raw Data (Source Data or Atomic Data)?—Definition from WhatIs.com." http://searchdatamanagement.techtarget.com/definition/raw-data, Retrieved on Dec. 13, 2016.
(Continued)

*Primary Examiner* — Lynn D Feild
*Assistant Examiner* — Jessica J South
(74) *Attorney, Agent, or Firm* — Weiss & Arons LLP; Michael A. Springs, Esq.

(57) ABSTRACT

An individualized software container is provided. The software container may be created by a remote entity. The software container may be located on a computer of a local entity. The software container may provide an entity separation between the local entity and at least one other entity. The software container may encompass a plurality of containers. The software container may communicate with a plurality of other software containers. The plurality of other software containers may be associated with at least one other entity. The software container may host its own database. The software container may include a plurality of security features associated with the remote entity. The software container may include a container-encrypted fingerprint ("CEF"). The CEF may enable encrypted end-to-end connection between the software container and the remote entity. The CEF may leverage fingerprinting and/or tokenization of the software container.

3 Claims, 6 Drawing Sheets

View X

View Y

View Z

(56) References Cited

U.S. PATENT DOCUMENTS

| | | | |
|---|---|---|---|
| 6,341,373 | B1 | 1/2002 | Shaw |
| 6,362,836 | B1 | 3/2002 | Shaw et al. |
| 6,381,631 | B1 | 4/2002 | van Hoff |
| 6,738,783 | B2 | 5/2004 | Melli et al. |
| 7,197,570 | B2 | 3/2007 | Eylon et al. |
| 7,213,208 | B2 | 5/2007 | Reichel et al. |
| 7,478,381 | B2 | 1/2009 | Roberts et al. |
| 9,116,768 | B1 | 8/2015 | Sawhney et al. |
| 9,219,611 | B1 | 12/2015 | Naik |
| 2004/0181667 | A1* | 9/2004 | Venters, III ............. G06F 21/10 713/164 |
| 2005/0154923 | A1* | 7/2005 | Lok .................... H04L 63/0428 726/19 |
| 2005/0246357 | A1 | 11/2005 | Geary et al. |
| 2007/0101159 | A1* | 5/2007 | Zhang ................ H04L 63/0428 713/193 |
| 2014/0108786 | A1* | 4/2014 | Kreft ...................... G06F 21/71 713/156 |
| 2014/0298041 | A1* | 10/2014 | Consalus ............. G06F 21/602 713/193 |
| 2016/0085954 | A1* | 3/2016 | Tunnell ................... H04L 63/18 726/7 |
| 2017/0177892 | A1* | 6/2017 | Tingstrom .......... G06F 21/6218 |
| 2017/0180335 | A1* | 6/2017 | Quinlan ................. H04L 63/08 |
| 2018/0114126 | A1* | 4/2018 | Das, Sr. ............ G06F 17/30598 |

OTHER PUBLICATIONS

"Man-in-the-middle Attack," Wikimedia Foundation, Inc., Dec. 8, 2016.

Google Search for "Source Code," Retrieved on Dec. 13, 2016.

Google Search for "What is Source Data," Retrieved on Dec. 13, 2016.

\* cited by examiner

AUTONOMOUS SOFTWARE CONTAINERS

FIELD OF TECHNOLOGY

This invention relates to software. More specifically, this invention relates to software containers and/or modules.

BACKGROUND OF THE DISCLOSURE

Various entities may be inter-connected in networked environments. Local entities, remote entities and/or central entities may communicate with each other through connections in the networked environment. Conventionally, source code and/or databases utilized by many of the entities may be located at one or more central entities. The local and remote entities may require access to the source code and/or databases located at the central entities. The local and/or remote entities may communicate with the central entity in order to process data, access the databases and perform transactions.

Because the source code and/or databases exploited by the entirety of the network are located at one or more central entities, the central entities may require relatively large computer systems, relatively oversized system databases and relatively many system resources.

In addition, numerous remote and local entities may store privileged data on the central entity's database. Because the privileged data resides at one central location, exists a possibility for a breach in the data security because one local or remote entity may gain access another local or remote entity's privileged data at the central location.

Therefore, a protected construct at the local or remote entity would be desirable. It would be further desirable for each of a plurality of such constructs to reside on a distinct entity included in a network. It would be further desirable for each of the constructs to have the capability to communicate directly with other constructs.

SUMMARY OF THE DISCLOSURE

An autonomous software module is provided. The autonomous software module may be in communication with a remote entity. The autonomous software module may be transmitted from the remote entity to a local computer.

The local autonomous software module may maintain communication with the remote entity. The integrity of communications between the remote entity and the local entity may be maintained by a two-way interrogation and/or verification mechanism. The two-way interrogation and/or verification mechanism may invalidate one or more illegitimate communications and/or communication hijacks between the local computer and the remote entity.

The autonomous module may encompass a plurality of modules that reside within the module itself. A first selection or subset of the encompassed modules may be viewable in the entirety of a plurality of module views. A second selection or subset of the plurality of module views may be hidden in a first selection or subset of the plurality of module views. The second selection or subset of the plurality of module views may be viewable in a second selection or subset of the plurality of module views.

The autonomous module may be configured to host its own database. The hosting its own database may free the autonomous module from utilization of storage locations on a remote database. The remote database may be associated with the remote entity. The hosting its own database may also protect the contents of the database from security threats. The security threats may be located at the remote database.

The autonomous module may include a container-encrypted fingerprint ("CEF"). The CEF may enable an encrypted end-to-end connection between the autonomous module and the remote entity. The CEF may also leverage fingerprinting and/or tokenization of the autonomous module. Fingerprinting and/or tokenization of the autonomous module may ensure that the autonomous module is only usable with a set of specifications. The set of specifications may be specified by the remote entity.

The autonomous module may also include an audit section. The audit section may include a plurality of log files. The audit section may be configured to write a plurality of transactions that occurred within the autonomous module into one or more log files. The audit section may also be configured to transmit the log files to the remote entity. The transmission of the log files may occur at a specific time, for example, 10:00 AM every day, or every hour on the hour. The transmission of the log files may occur upon completion of a time interval, for example, after every sixty minutes or after every twenty-four hours. The difference between the occurrence at a specific time and the occurrence upon completion of a time interval may be in the event that the module is reset.

It should be appreciated that the remote entity may receive many log files from many different software containers. The remote entity may reconcile the transactions included in the transmitted log files. The remote entity may also update data stored at the remote entity to ensure that the data stored at the remote entity correspond to the data included in the software container.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
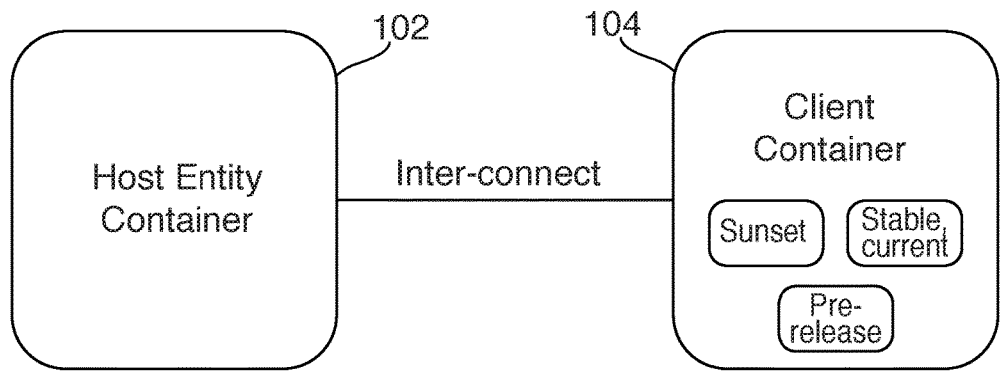
FIG. 1 shows an illustrative system diagram in accordance with principles of the invention.

An individualized software container may be provided. The individualized software container may be created by a remote entity. The individualized software container may be located on a client-side computer. The individualized software container may be transmitted from the remote entity to the client-side computer. The remote entity may be located at a different physical location than the client-side computer. The remote entity may be located at a different virtual location than the client-side computer. The remote entity may transmit the individualized software container to the client-side computer. The transmission may be over a network. The transmission may be via physical mailing of a hardware component—e.g., a CD, a USB drive, a removable memory device—that contains the software container.

The individualized software container may be configured to provide an entity separation between a local entity, which may be associated with the client-side computer, and at least one other entity. In some embodiments, there may be a plurality of individualized software containers located on a plurality of different entities' computers. Each software container may host or include its own database. Each database may include privileged information. The privileged information may relate to the entity on whose hardware (or computer) the software container is located. Previously, privileged information associated with each entity was stored together at a central entity storage location, and each entity accessed the central database to retrieve its discrete information. Utilizing the software container system, privileged information may be located only on the hardware of the entity to which it is associated. Because each entity's privileged information may not be stored together with other entities privileged information at a single, central, location, there may be less of a probability of a security leak of the privileged information.

At times a user may query a software container for a specific data element or information segment. In this aspect as well, software containers may minimize the expended search time. Instead of searching through the entity records of all of the entities (which were previously held in the centralized database) the software container only has to search through the records held in the individual software container (which are a small percentage of what was previously held in the centralized database).

Software containers may reduce the amount of computer resources required at the centralized database. Because each entity may host its own database, the central entity and centralized database need not include relatively large databases, high speed database lookup algorithms, and relatively oversized computer systems required to manage a large amount of data. In addition, each entity may not need to purchase more physical memory to accommodate the software container. Each entity may only be required to accommodate a piece of software that requires a relatively small amount of physical memory. Most entities include at least a small amount of empty physical memory locations.

The individualized software container may also be configured to encompass a plurality of software containers. Each of the encompassed software containers may serve a different purpose. For the purposes of this application, the software container that may hold other software containers may be called the parent software container. The encompassed software containers may be called child software containers. For example, transactions found only in the parent software container may be low-risk or low-value transactions. Transactions found in a first encompassed container, or first child container, may be medium-risk or medium-value transactions. Transactions found in a second encompassed container, or second child container, may be high-risk or high-value transactions.

In some embodiments, a child container may encompass one or more different child containers. A double-nested child container may be called a grandchild container.

Depending on user permissions, different child containers may be viewable. For example, when a first level user authenticates into a parent software container, the low-value transactions may be visible and the first and second child containers may be hidden. A first level user may be required to authenticate using a password. When a second level user authenticates into a software container, the low-value transactions, included in the parent container, and the medium-level transactions, included in the first child container, may be visible. A second level user may be required to authenticate using a password and biometric means in order to access transactions included in the parent container and the first child container. When a third level user or administrator authenticates into a software container, the low-value transactions, included in the parent container, the medium-value transactions, included in the first child container, and the high-value transactions, included in the second child container may be visible. A third level user or administrator may require two-step authentication, biometric authentication as well as an approval for authentication by an additional third level user or administrator prior to authenticating into the parent software container with permissions to view both child containers.

There may a plurality of container views. Each of the container views may enable different transactions or different details in different transactions to be visible. A first selection or subset of the encompassed containers may be visible or viewable in the entirety of the plurality of container views. A second selection or subset of the encompassed containers may be hidden in a first selection or subset of the plurality of container views. The second selection or subset of the encompassed containers may be viewable in a second selection or subset of the plurality of container views.

The software container may be configured to communicate with a plurality of other software containers. The plurality of other software containers may be associated with at least one other entity. The communications between the software container and the plurality of other software containers may be governed by relationship management, privacy, consent, security, controls and/or a rules engine. The communications may allow for client servicing, service exchange, intra-network zones and other communication services.

The software container may host its own database. The database may be located at the same physical location as the software container. The software container may have complete control over the database. The software container may be able to query its own database. Hosting its own database may free the software container from utilization of storage locations on a remote database. The remote database may be associated with the remote entity. Hosting its own database may also protect the contents of the database from security threats that may occur at a database located at the remote entity.

The software container may include a plurality of security features. The security features may be the same security features as the security features included on databases and systems associated with the remote entity. The security features may be derived, or received, from the remote entity. The remote entity may be in communication with the software container. The remote entity may ensure that the security features are updated and effective via the communications between the software container and the remote entity.

The software container may include a container-encrypted fingerprint ("CEF"). The CEF may be a portion of the security features. The CEF may enable encrypted end-to-end connection between the software container and the remote entity. The CEF may also leverage fingerprinting and/or tokenization of the software container. Fingerprinting and/or tokenization may ensure that the software container is only operable in an environment that complies with the specifications specified by the remote entity.

The fingerprint and/or token may be designed for one-time use. The fingerprint and/or token may be designed for a plurality of uses. The fingerprint and/or token may ensure that the software container is complying with the rules established by the remote entity. The rules may be usage rules of the software container. At any point that the software container is no longer in compliance with the rules established by the remote entity, the fingerprinting and/or tokenization mechanism may terminate the usage of the software container. The termination may be temporary. The termination may be permanent. The termination may include a software container locking system. The software container locking system may disable usage of the software container by a user. The termination may include a software write-over. The termination may be any other suitable software termination method.

The fingerprint and/or token associated with the fingerprinting and/or tokenization may alternate and/or rotate based on source data, geographical data, biometric data and/or user randomized data. The source data may be data retrieved from and/or associated with the client-side or local computer source code. The geographical data may be detected based on the IP ("internet protocol") address of the client-side computer. The biometric data may be stored on the client-side computer. The biometric data may be associated with a user of the client-side computer. The user randomized data may include data inputted by a user of the client-side computer. The randomization may occur upon user input of data—i.e., the client-side computer may perform randomization on data after the data is inputted by a user.

The software container may include an audit section. The audit section may be configured to write a plurality of transactions that occur within the software container into a plurality of log files. The audit section may also be configured to store the log files in the audit section of the software container.

The software container may be configured to transmit the log files to the remote entity. The remote entity may be configured to process the plurality of transactions included in the log files. The software container may be configured to communicate with the remote entity via a connection with the remote entity.

The software container may communicate with a second software container located on a second entity. The communications may relate to a transaction that is associated with the second entity. It should be appreciated that the security between the two entities may be governed under the security governing policies described above.

At times, the software container may communicate with the second software container regarding a transaction. After the communication, both the software container and the second software container may transmit details of the transaction to the central processing center. The central processing center may reconcile a majority of the received transactions.

The software container may also include connection encryption integrity. The connection encryption integrity between the software container and the remote entity may be maintained by a two-way interrogation and/or verification mechanism. The mechanism may have the capability to invalidate a transaction in order to prevent a MITM ("man in the middle") attack, hijack, internal security threats and other communication hijacks.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative system diagram. Host entity container 102 may be inter-connected with client container 104. Host entity container 102 may transmit versions of the software of container 104 itself to client container 104. Therefore, client container 104 may include a sunset version, a pre-release version and a stable, current version of software included in client container 104. A sunset version may be a version that is being intentionally phased out. A pre-release version may be a version before it is officially released. Including numerous versions in client container 104 may allow for release and withdrawal of products and services as needed. In certain embodiments, a client container may be required to subscribe in order to obtain the pre-release version.

Figure 2:
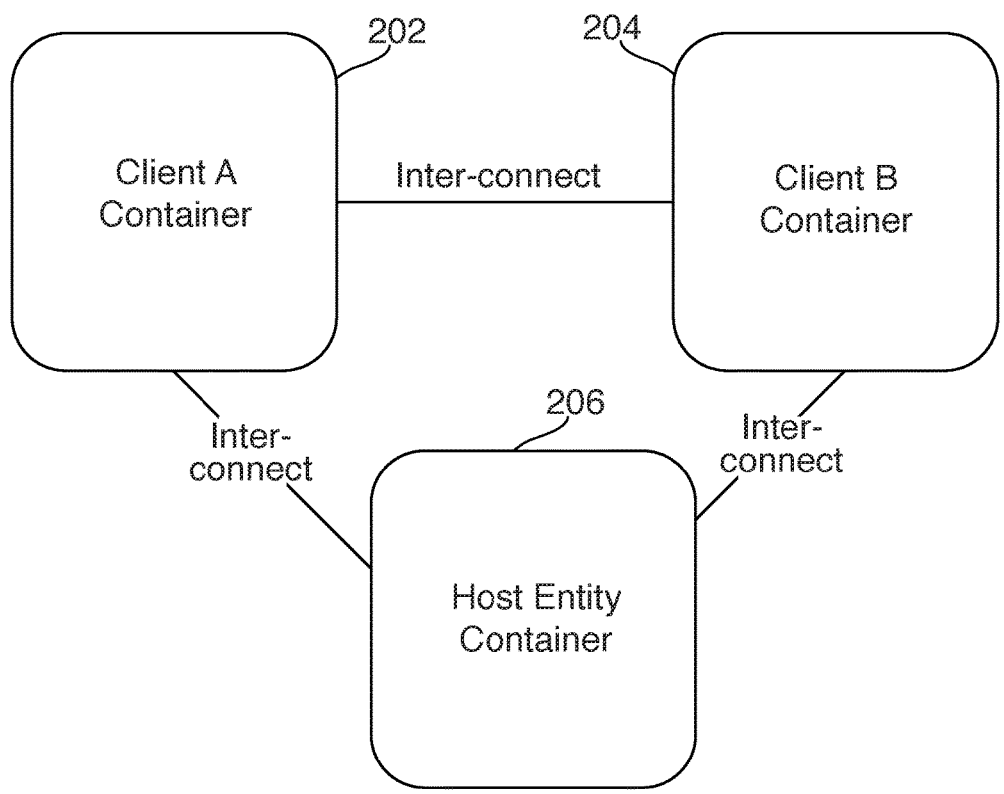
FIG. 2 shows another illustrative system diagram in accordance with principles of the invention.

FIG. 2 shows another illustrative system diagram. Client A container 202, client B container 204 and host entity container 206. It should be appreciated that although two client containers are shown many more may be available. Client A container 202 may be interconnected with client B container 204. Client A container 202 may be interconnected with host entity container 206. Client B container may be interconnected with host entity container 206. It should be appreciated that information as well as transactions may be transferred via the interconnections. It should also be appreciated that the security governing the interconnection between client A container 202 and client B container 204 may be higher than the security governing the interconnections between the client containers and host entity container 206.

Figure 3:
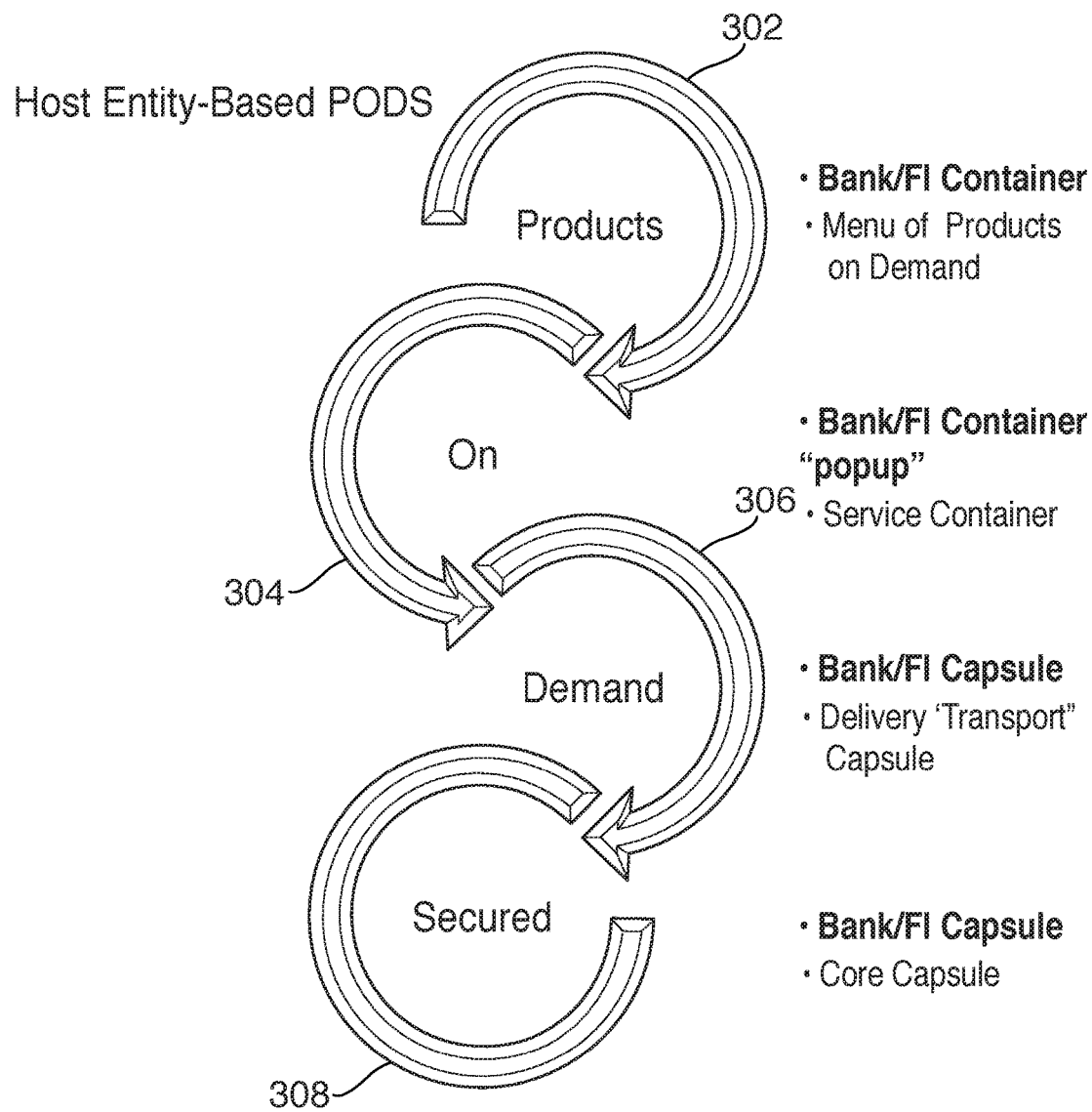
FIG. 3 shows an illustrative diagram in accordance with principles of the invention.

FIG. 3 shows an illustrative diagram of Host entity-based PODS. PODS, for the host entity, may include an acronym for products on demand secured. "Products" 302 may be creation of a menu of products. "On" 304 may represent a container popup, or container within a container. "Demand" 306 may represent delivery transport capsule. The delivery transport capsule may enable transmission of a software container. The software container may be transmitted in a capsule. "Secured" 308 may represent that the core of the capsule retains the security requirements of the host entity.

Figure 4:
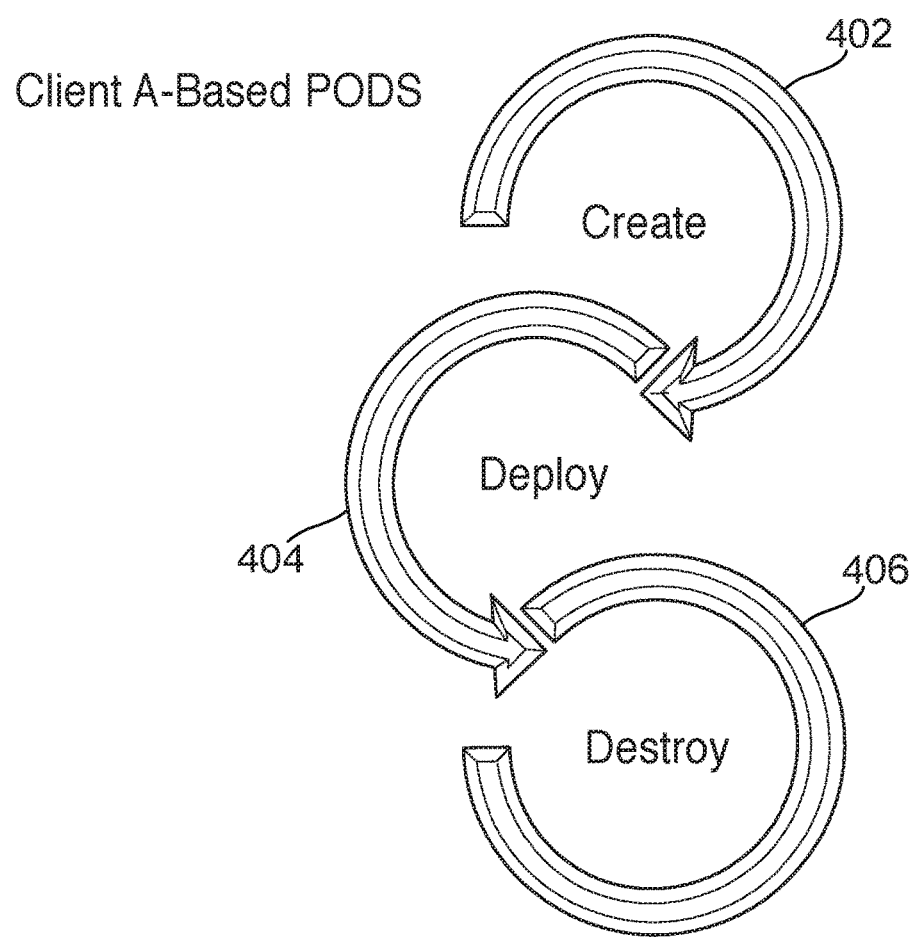
FIG. 4 shows another illustrative diagram in accordance with principles of the invention.

FIG. 4 shows an illustrative diagram of a client based PODS. Client A may enable the creation of a software container, as shown at 402. Client A may deploy the software container, as shown at 404. Client A may destroy the software container upon receipt of a newer version of the software container, as shown at 406.

It should be appreciated that a container may be created or destroyed as needed. Each time a container is created, the container may receive a new container encrypted fingerprint ("CEF").

Figure 5:
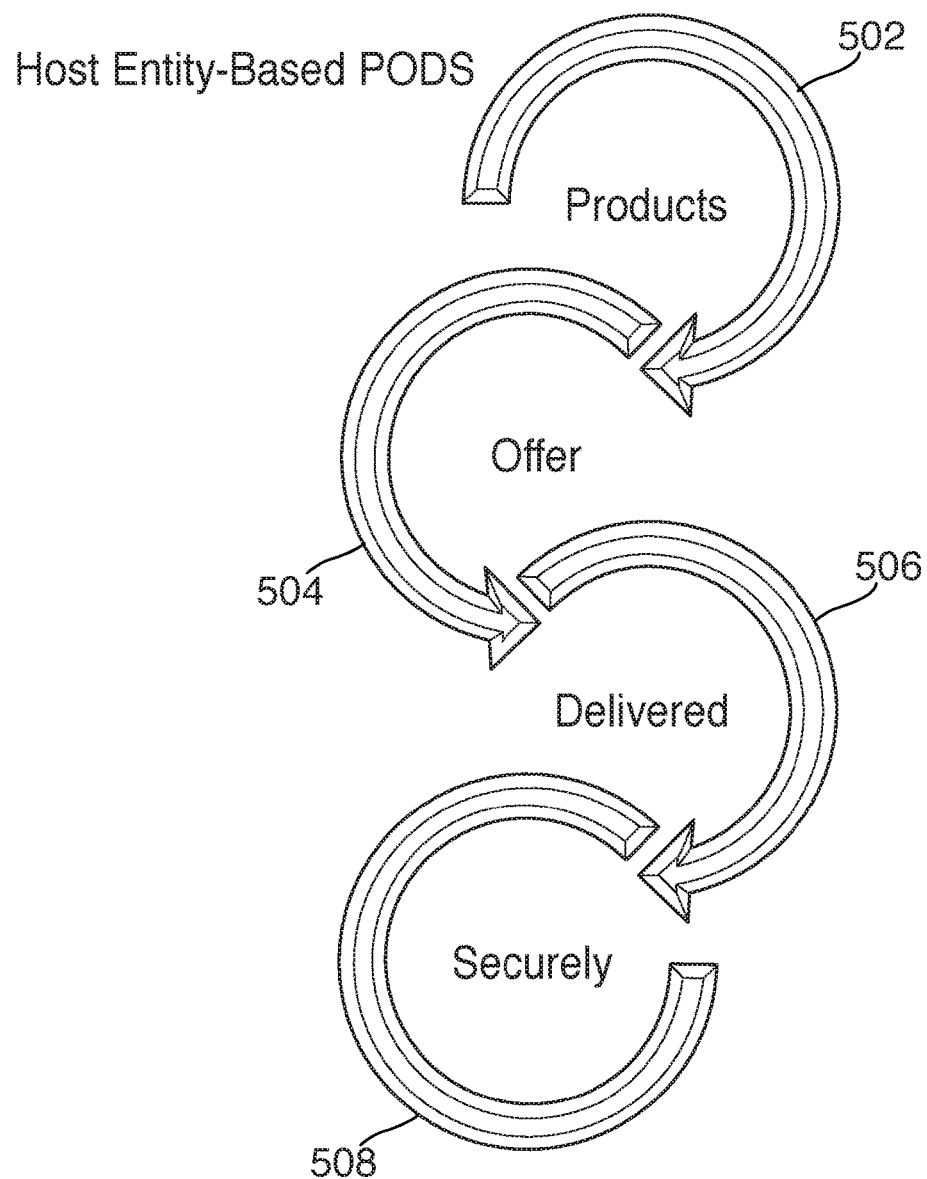
FIG. 5 shows yet another illustrative diagram in accordance with principles of the invention.

FIG. 5 shows another illustrative diagram of a client based PODS. Product 502 may be created by a host entity. Product 502 may be offered to client B, as shown at 504. Product 502 may delivered to client B, as shown at 506. Product 502 may be delivered in a secure manner, as shown at 508.

Figure 6:
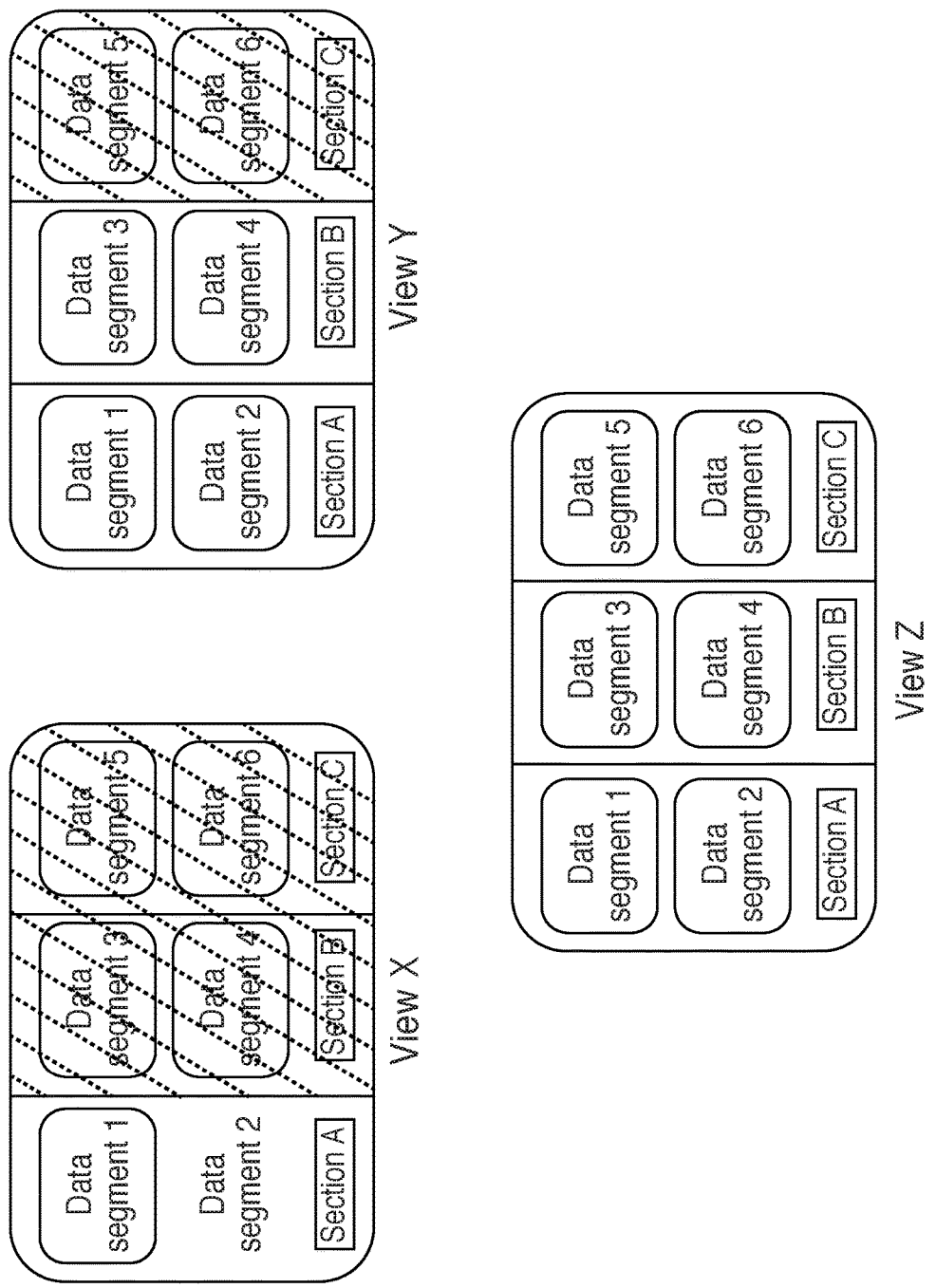
FIG. 6 shows a plurality of system views in accordance with principles of the invention.

FIG. 6 shows illustrative system views. A software container may be divided into sections A, B and C. The software container may include different views of the software container. In some views, all of the sections may be visible, while in other views, only some of the sections may be visible. View X show section A, which includes data segments one and two, section B, which includes data segments three and four and section C, which includes data segments five and six. Section A may be visible in view X, while sections B and C may not be visible in view X. The user of the software container may have low level permissions and may therefore only be able to view section A.

A user viewing the software container in view Y may have medium level permissions. Therefore, the user may be able to view both sections A and B. Section C may not be visible to a user viewing the software container though view Y.

A user viewing the software container in view Z may have high level permissions. Therefore, the user may be able to view sections A, B and C.

It should be appreciated that, in some embodiments, a user may have permissions to view certain sections but may be unable to edit the transactions in the sections that they are able to view. This may be called read permissions. Another user may be able to view the transactions in certain sections and edit the transactions in the sections that they are able to view. This may be called read-write permissions.

It should be appreciated that a container may be divided to support tiered offerings. For example, company X may include two divisions, division Y and division Z. Company X may have purchased four products, product A, product B, product C and product D. Division Y may maintain a container that may include product A and product B. Division Z may maintain a container that may include product C and product D. Products A, B, C and D may all be included in a container maintained by company X. In some embodiments, the containers of division Y and division Z may be included in the container of company X.

Figure 7:
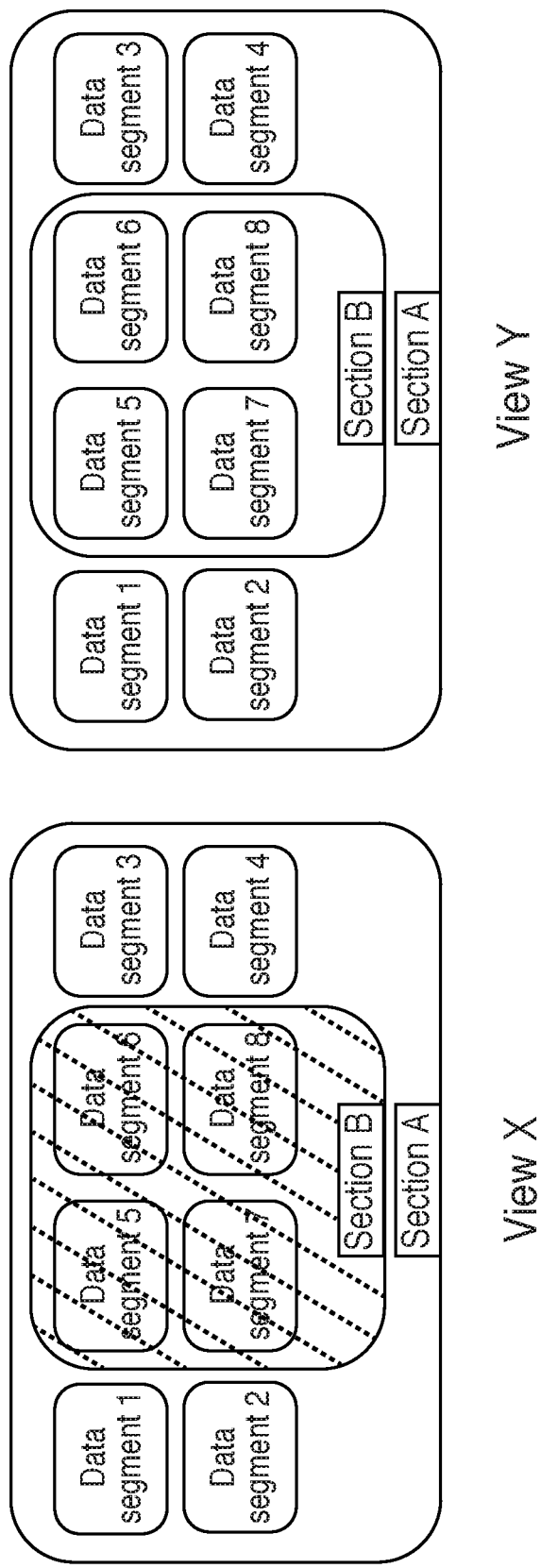
FIG. 7 shows another plurality of system views in accordance with principles of the invention.

FIG. 7 shows more illustrative system views. It should be appreciated that the software container shown in FIG. 7 may include a child container, while the software container shown in FIG. 6 may include a container divided into sections. The software container may include sections A and B. Section A may be a parent container. Section B may be a child container. Section A may include data segments one, two, three and four. Section B may include data segments five, six, seven and eight.

A user viewing the software container through view X may have low level permissions. The user may be able to view the data segments included in section A, but the user may be unable to view the data segments included in section B.

A user viewing the software container through view Y may have high level permissions. The user may be able to view the data segments included in sections A and B. In some embodiments, the user may have read permissions on the data segments included in sections A and B. In other embodiments, the user may have read-write permissions on the data segments included in sections A and B. In yet other embodiments, the user may have read permissions on sections A and B and write permissions only on section A.

Thus, methods and apparatus for autonomous software containers have been provided. Persons skilled in the art will appreciate that the present invention can be practiced by other than the described embodiments, which are presented for purposes of illustration rather than of limitation. The present invention is limited only by the claims that follow.

What is claimed is:

1. An individualized software container created by a remote entity, located on a client-side computer, said client-side computer being associated with a local entity, the software container configured to:
   provide an entity separation between the local entity and at least one other entity;
   encompass a plurality of containers within itself, wherein a first selection of the encompassed containers are viewable in the entirety of a plurality of container views while a second selection of the encompassed containers are hidden in a first selection of the plurality of container views and viewable in a second selection of the plurality of container views;
   communicate with a plurality of other software containers associated with the at least one other entity;
   host its own local database, wherein hosting its own local database:
      frees the software container from utilization of storage locations on a remote database associated with the remote entity; and
      protects the contents of the local database from security threats located at the remote database;
   wherein:
      the software container comprises:
         a plurality of security features associated with the remote entity; and
         a container-encrypted fingerprint ("CEF") that:
            enables encrypted end-to-end connection between the software container and the remote entity; and
            leverages fingerprinting and/or tokenization of the software container to ensure that the software container is only usable with a set of specifications specified by the remote entity said fingerprinting and/or tokenization being designed for one-time use;
      a fingerprint and/or token associated with the fingerprinting and/or tokenization alternates and/or rotates based on:
         source data;
         geographic data, said geographic data being detected based on an IP ("internet protocol") address of the client-side computer;
         biometric data; and/or
         user randomized data.

2. An individualized software container created by a remote entity located on a client-side computer, said client-side computer being associated with a local entity, the software container configured to:
   provide an entity separation between the local entity and at least one other entity;

encompass a plurality of containers within itself, wherein a first selection of the encompassed containers are viewable in the entirety of a plurality of container views while a second selection of the encompassed containers are hidden in a first selection of the plurality of container views and viewable in a second selection of the plurality of container views;

communicate with a plurality of other software containers associated with the at least one other entity;

host its own local database, wherein hosting its own local database;

frees the software container from utilization of storage locations on a remote database associated with the remote entity; and protects the contents of the local database from security threats located at the remote database:

wherein:

the software container comprises:

a plurality of security features associated with the remote entity; and a container-encrypted fingerprint ("CEF") that:

enables encrypted end-to-end connection between the software container and the remote entity; and leverages fingerprinting and/or tokenization of the software container to ensure that the software container is only usable with a set of specifications specified by the remote entity, said fingerprinting and/or tokenization being designed for one-time use;

a fingerprint and/or token associated with the fingerprinting and/or tokenization alternates and/or rotates based on:

source data;

geographic data:

biometric data, the biometric data being is configured to be stored on the client-side computer and associated with a user of the client-side computer; and/or user randomized data.

3. An individualized software container created by a remote entity, located on a client-side computer, said client-side computer being associated with a local entity, the software container configured to:

provide an entity separation between the local entity and at least one other entity;

encompass a plurality of containers within itself, wherein a first selection of the encompassed containers are viewable in the entirety of a plurality of container views while a second selection of the encompassed container are hidden in a first selection of the plurality of container views and viewable in a second selection of the plurality of container views;

communicate with a plurality of other software containers associated with the at least one other entity;

host its own local database, wherein hosting its own local database:

frees the software container from utilization of storage locations on a remote database associated with the remote entity; and protects the contents of the local database from security threats located at the remote database;

wherein:

the software container comprises:

a plurality of security features associated with the remote entity; and a container-encrypted fingerprint ("CEF") that:

enables encrypted end-to-end connection between the software container and the remote entity; and leverages fingerprinting and/or tokenization of the software container to ensure that the software container is only usable with a set of specifications specified by the remote entity, said fingerprinting and/or tokenization being designed for one-time use;

a fingerprint and/or token associated with the fingerprinting and/or tokenization alternates and/or rotates based on:

source data;

geographic data;

biometric data; and/or user randomized data, said user randomized data including randomized data inputted from a user of the client-side computer, wherein a randomization process is executed on the data inputted from the user of the client-side computer upon the input of the data from the user.

\* \* \* \* \*